(12) United States Patent
Chen

(10) Patent No.: US 7,809,908 B2
(45) Date of Patent: Oct. 5, 2010

(54) DISK SNAPSHOT ACQUISITION METHOD

(75) Inventor: Chih-Wei Chen, Taipei (TW)

(73) Assignee: Inventec Corporation, Taipei (TW)

( * ) Notice: Subject to any disclaimer, the term of this patent is extended or adjusted under 35 U.S.C. 154(b) by 895 days.

(21) Appl. No.: 11/709,805

(22) Filed: Feb. 23, 2007

(65) Prior Publication Data

US 2008/0209132 A1     Aug. 28, 2008

(51) Int. Cl.
*G06F 12/00* (2006.01)
*G06F 17/30* (2006.01)

(52) U.S. Cl. .............. 711/162; 707/999.203; 707/999.204; 711/161; 711/170; 711/171; 711/173

(58) Field of Classification Search .......... 707/203, 707/204; 711/161, 162, 170, 171, 173
See application file for complete search history.

(56) References Cited

U.S. PATENT DOCUMENTS 6,081,875 A * 6/2000 Clifton et al. ............ 711/162
7,631,158 B2 * 12/2009 Chen ........................ 711/162
2007/0106701 A1 * 5/2007 Periyasamy ............... 707/200
2007/0156985 A1 * 7/2007 Tsai et al. .................. 711/162

* cited by examiner

*Primary Examiner*—Kevin L Ellis
*Assistant Examiner*—Mehdi Namazi
(74) *Attorney, Agent, or Firm*—Bacon & Thomas, PLLC

(57) ABSTRACT

A disk snapshot acquisition method, which is applied in a server comprising a memory allocated with a kernel space and a hard disk, comprises the steps of allocating all chunks having data stored as a disk volume in said hard disk; allocating a first portion and a second portion in said hard disk; establishing a snapshot pointer in said kernel space, said snapshot pointer pointing to a starting address of said first portion in said hard disk; and when original data in one of said chunks of said disk volume is to be modified, duplicating said original data to a chunk in said second portion as backup data, then modifying said original data into modified data, and storing a piece of mapping information comprising an address of said modified data and an address of said backup data corresponding to said modified data to a copy-on-write table in said first portion.

11 Claims, 3 Drawing Sheets

DISK SNAPSHOT ACQUISITION METHOD

FIELD OF THE INVENTION

The present invention relates to a disk snapshot acquisition method, and more particularly to a disk snapshot acquisition method utilizes a snapshot pointer in a server and stores copy-on-write tables in a hard drive to achieve stability of said server.

BACKGROUND OF THE INVENTION

Contemporary computer operating systems usually support disk snapshot acquisition technology (e.g. Microsoft provides a service called Volume Shadow Copy Service (VSS) in Windows XP and Windows Server 2003). A snapshot technology is a file system preserving mechanism. A disk snapshot differs from a regular data backup duplicating in that it does a fast system file backup of a disk volume (a disk volume consists of disk chunks with data stored in them) at a random point in time and no file duplication is involved when a snapshot is being acquired. Directory structures in the data structure of the file system in use are therefore preserved. Different versions of snapshot can be promptly established for a disk volume at various point of time to compensate for the lack of timeliness in traditional backup mechanism. In addition, when accidents such as a virus attack or disk breakdown happens to a disk drive, the administrator can restore a pre-accident snapshot to replace a disk volume and minimize damage.

As aforementioned, no file duplication is involved when a disk snapshot is taking place. Instead, when there is any change in the disk chunks of a disk volume, first original data in said disk chunks are duplicated to other disk chunks not belonged to said volume in the hard disk, original data in said disk chunks of said disk volume are then modified as intended. Furthermore, in a kernel memory space provided by the operating system (e.g. Linux) in a server, a Copy-On-Write (COW) table is established to record information of the destination disk chunk for a disk chunk storing original data. Said technology is called Copy-On-Write technology.

However, an operating possesses a limited kernel space and the kernel space does not grow with an increase in system memory space. The COW table occupies more space in the kernel space when more disk chunks of a disk volume require modifications. After taking a significant number of snapshots of a disk volume at different point of time, or a rapid increase in disk volume size, the kernel space will be completely occupied by a great amount of COW tables and finally exhausted, causing a breakdown in the operating system. Consequently, development of a disk snapshot acquisition method to solve the above-mentioned problems has become a critical issue.

SUMMARY OF THE INVENTION

After considerable research and experimentation, a disk snapshot acquisition method according to the present invention has been developed so as to overcome the drawback such as an exhaustion in kernel space resulting in a breakdown of operating system associated with said prior art.

It is an object of the present invention to provide a disk snapshot acquisition method using a snapshot pointer in a server comprising a memory allocated with a kernel space and a hard disk with all chunks having data stored are allocated as a disk volume. When a snapshot is being acquired by said server, a first portion and a second portion in said hard disk are first allocated and a snapshot pointer is established in said kernel space with said snapshot pointer pointing to a starting address of said first portion. When original data in one of said chunks of said disk volume is to be modified, said original data is duplicated to a chunk in said second portion as backup data, then said original data is modified into modified data, and a piece of mapping information comprising an address of said modified data and an address of said backup data corresponding to said modified data to a copy-on-write table is stored in said first portion. Since snapshot pointers occupy minimal space of said kernel space and COW tables are stored in a hard drive with capacity much larger than the kernel space, the kernel is no longer occupied by COW tables and thus saving its space. In the mean time, no abnormal behavior will occur during snapshot acquisition and the stability of the server is maintained.

It is another object of the present invention that when said server is to make a data recovery of said disk volume, said servers reads said mapping information corresponding to said modified data from said copy-on-write table to obtain said backup data duplicated in said second portion, then overwrites said backup data to said disk chunks having said modified data, thereby said disk volume is recovered.

The above and other objects, features and advantages of the present invention will become apparent from the following detailed description taken with the accompanying drawings.

DETAILED DESCRIPTION OF THE PREFERRED EMBODIMENTS

Figure 1:
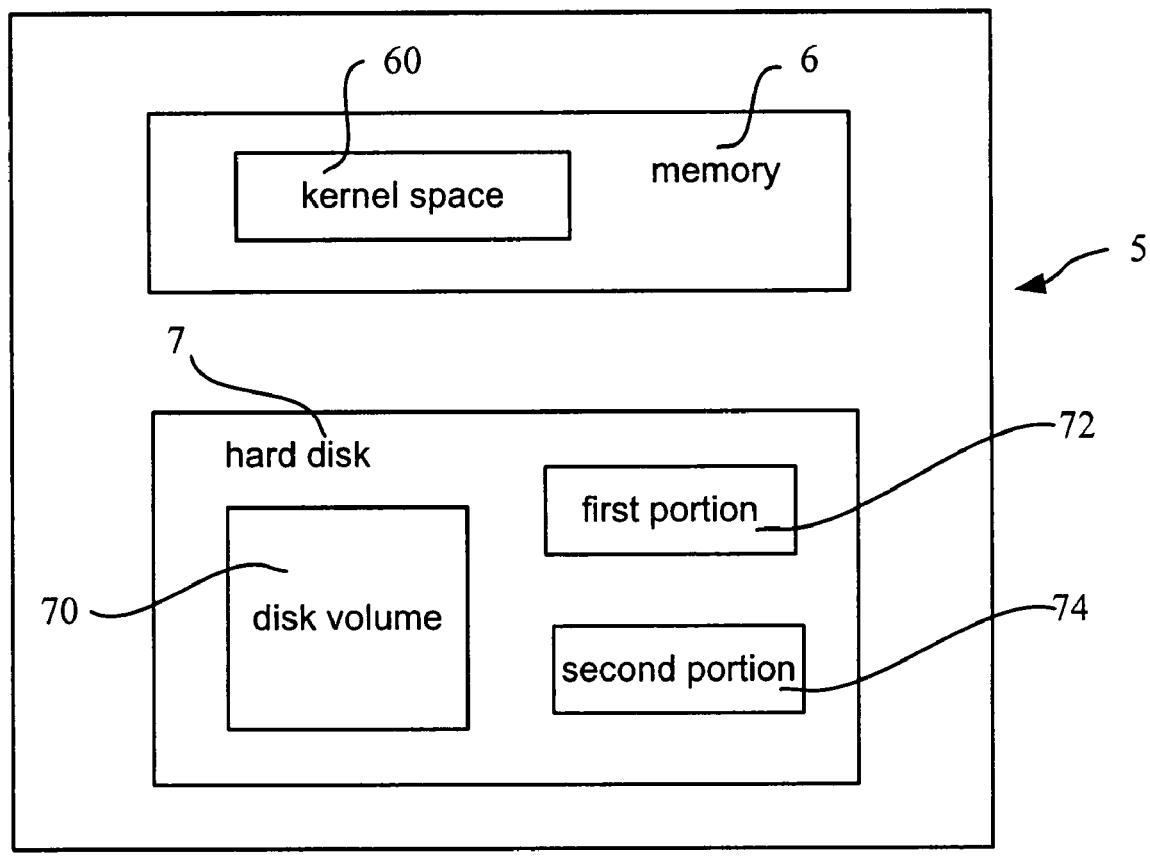
FIG. 1 is a block diagram of the present invention.
Figure 2:
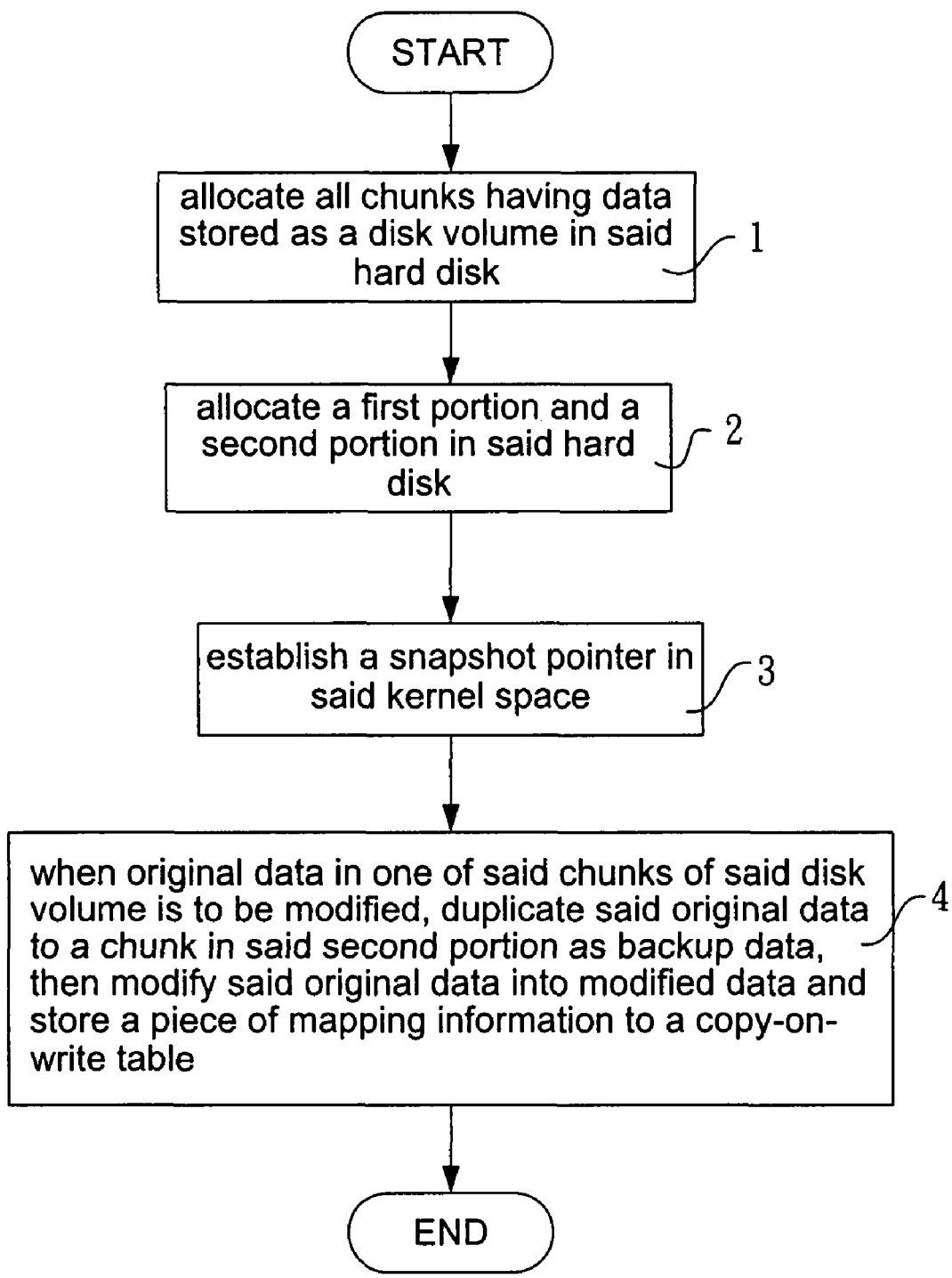
FIG. 2 is a flow chart illustrating the procedure of a disk acquisition method according to the present invention.

Refer to FIG. 1 and FIG. for the block diagram of a disk snapshot acquisition method according to the present invention. Said method is applied in a server 5 comprising at least a memory 6 and at least a hard disk 7. Said memory 6 is allocated with a kernel space 60, when a snapshot of said hard disk 7 is being acquired by said server 5, said server performs said method in the following procedure.

(1) All chunks having data stored are allocated as a disk volume 70 in said hard disk 7.

(2) A first portion 72 and a second portion 74 in said hard disk 7 are allocated where the capacity of said first portion equals the maximum space requirement of a copy-on-write table. A copy-on-write table has multiple pieces of mapping information with each piece of mapping information comprising an address of modified data and an address of backup data corresponding to said modified data. The capacity of said second portion 74 equals the space requirement for accommodating all chunks in said volume 70 containing said original data which is to be duplicated in said hard disk 7 as said backup data.

Figure 3:
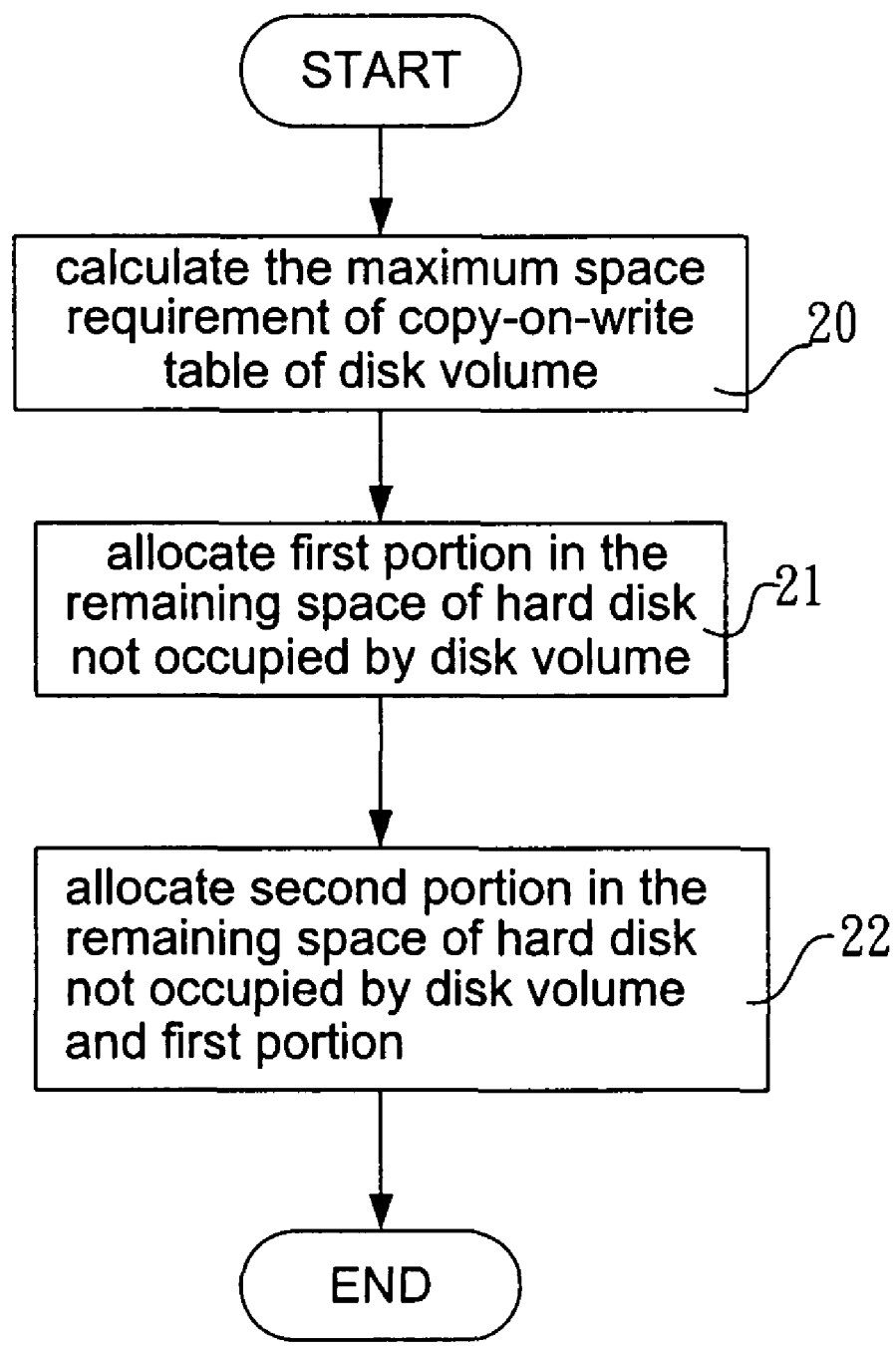
FIG. 3 is a flow chart illustrating the procedure of allocating a first portion and a second portion in a hard drive according to the present invention.

Refer to FIG. 3 for a preferred embodiment of the present invention. The step for allocating said first portion 72 and said second portion 74 in said hard disk 7 further comprises:

(20) In response to the size of said volume 70, calculate the maximum space requirement of said copy-on-write table of said volume 70. In this preferred embodiment, the equation for said calculation is, maximum space requirement of said copy-on-write table=number of disk chunks in disks volume 70*size of one piece of mapping information . . . (A);

number of disk chunks=capacity of disk volume 70/capacity of a disk chunk . . . (B).

For example, assuming the capacity of said disk volume 70 is 100 G bytes, the capacity of a disk chunk is 64 K bytes, and the size of one piece of COW table mapping information is 16 bytes, then the maximum space requirement of said copy-on-write table equals (100 G bytes/64 K bytes)*16 bytes=25 M bytes.

(21) Allocate said first portion 72 in the remaining space of said hard disk 7 not occupied by said disk volume 70.

(22) Allocate said second portion 74 in the remaining space of said hard disk not occupied by said disk volume 70 and said first portion 72. This concludes the step in allocating said first portion 72 and said second portion 74 in said hard disk.

In said preferred embodiment, to improve the speed in reading said backup data, the location allocated in said hard disk 7 for said first portion 72 is ahead of the location allocated for said second portion 74. Moreover, backup data reading speed is at its highest when the location of the end of said first portion 72 is immediately followed by the location of the beginning of said second portion 74 in said hard disk.

(3) A snapshot pointer is established in said kernel space 60, said snapshot pointer points to a starting address of said first portion 72 in said hard disk 7; and (4) When original data in one of said chunks of said disk volume 70 is to be modified, first said original data is duplicated to a chunk in said second portion 74 as backup data, then said original data is modified into modified data, and a piece of mapping information comprising an address of said modified data and an address of said backup data corresponding to said modified data is stored to a copy-on-write table in said first portion 72. This concludes the snapshot acquisition procedure.

From the above-mentioned, hard drive 7 is used to store COW tables and since the capacity of hard drive 7 is much larger than the kernel space 60, the space in hard drive 7 will not be easily filled up with COW tables. Furthermore, as kernel space 60 now stores only address pointers which usually only occupy minimal storage space, said kernel space 60 is unlikely to be occupied and filled up by COW tables, thus achieving the goal of saving kernel space 60. In the mean time, COW tables are stored in hard drive 7 during snapshot acquisition by serve 5, as a result no abnormal behavior of server 5 will occur and the stability of server 5 is achieved.

In said preferred embodiment, when said server 5 is to make further modification of said modified data in said disk volume 70, said server directly performs the modification on said disk chunks having said modified data without storing said modified data into said second portion so that said backup data of said modified data in said disk chunks in said disk volume 70 is preserved. Consequently, when said server 5 is to make a data recovery of said disk volume 70, said servers 5 reads said mapping information corresponding to said modified data from said copy-on-write table to obtain said backup data duplicated in said second portion 74, then overwrites said backup data to said disk chunks having said modified data, thereby said disk volume 70 is recovered While the invention herein disclosed has been described by means of specific embodiments, numerous modifications and variations could be made thereto by those skilled in the art without departing from the scope and spirit of the invention set forth in the claims.

What is claimed is:

1. A disk snapshot acquisition method in a server comprising a memory allocated with a kernel space and a hard disk, said method comprising:

allocating all chunks having data stored as a disk volume in said hard disk;

allocating a first portion and a second portion in said hard disk;

establishing a snapshot pointer in said kernel space, said snapshot pointer pointing to a starting address of said first portion in said hard disk; and when original data in one of said chunks of said disk volume is modified, duplicating said original data to a chunk in said second portion as backup data, then modifying said original data into modified data, and storing a piece of mapping information comprising an address of said modified data and an address of said backup data corresponding to said modified data to a copy-on-write table in said first portion.

2. The method of claim 1, wherein capacity of said first portion equals a maximum space requirement of said copy-on-write table.

3. The method of claim 2, wherein said copy-on-write table is capable of storing a plurality of said mapping information.

4. The method of claim 3, wherein capacity of said second portion equals a space requirement for accommodating all chunks containing said original data which is duplicated in said hard disk as said backup data.

5. The method of claim 1, wherein the step for allocating said first portion and said second portion in said hard disk further comprises:

calculating a maximum space requirement of said copy-on-write table according to capacity of said disk volume;

allocating said first portion in remaining space of said hard disk not occupied by said disk volume; and allocating said second portion in remaining space of said hard disk not occupied by said disk volume and said first portion.

6. The method of claim 2, wherein calculation of the maximum space requirement of said copy-on-write table comprises:

the maximum space requirement of said copy-on-write table=number of said chunks in said disks volume * size of one piece of said mapping information; and number of said chunks in said disks volume=the capacity of said disk volume/capacity of said chunk.

7. The method of claim 5, wherein the calculation of the maximum space requirement of said copy-on-write table comprises:

the maximum space requirement of said copy-on-write table=number of said chunks in said disks volume * size of one piece of said mapping information; and number of said chunks in said disks volume=the capacity of said disk volume/capacity of said chunk.

8. The method of claim 5, wherein a location allocated in said hard disk for said first portion is ahead of a location allocated for said second portion.

9. The method of claim 8, wherein a location of an end of said first portion is immediately followed by a location of a beginning of said second portion.

10. The method of claim 1, wherein when said server is to make further modification of said modified data in said chunks of said disk volume, said server directly performs the modification on said chunks having said modified data.

11. The method of claim 10, wherein when said server is to make a data recovery of said disk volume, said servers reads said mapping information corresponding to said modified data from said copy-on-write table to obtain said backup data duplicated in said second portion, then overwrites said backup data to said chunks having said modified data, thereby said disk volume is recovered.

* * * * *